March 7, 1933.  R. S. HOPKINS  1,900,878
DOCUMENT PHOTOGRAPHING APPARATUS
Filed Dec. 3, 1927   4 Sheets-Sheet 1
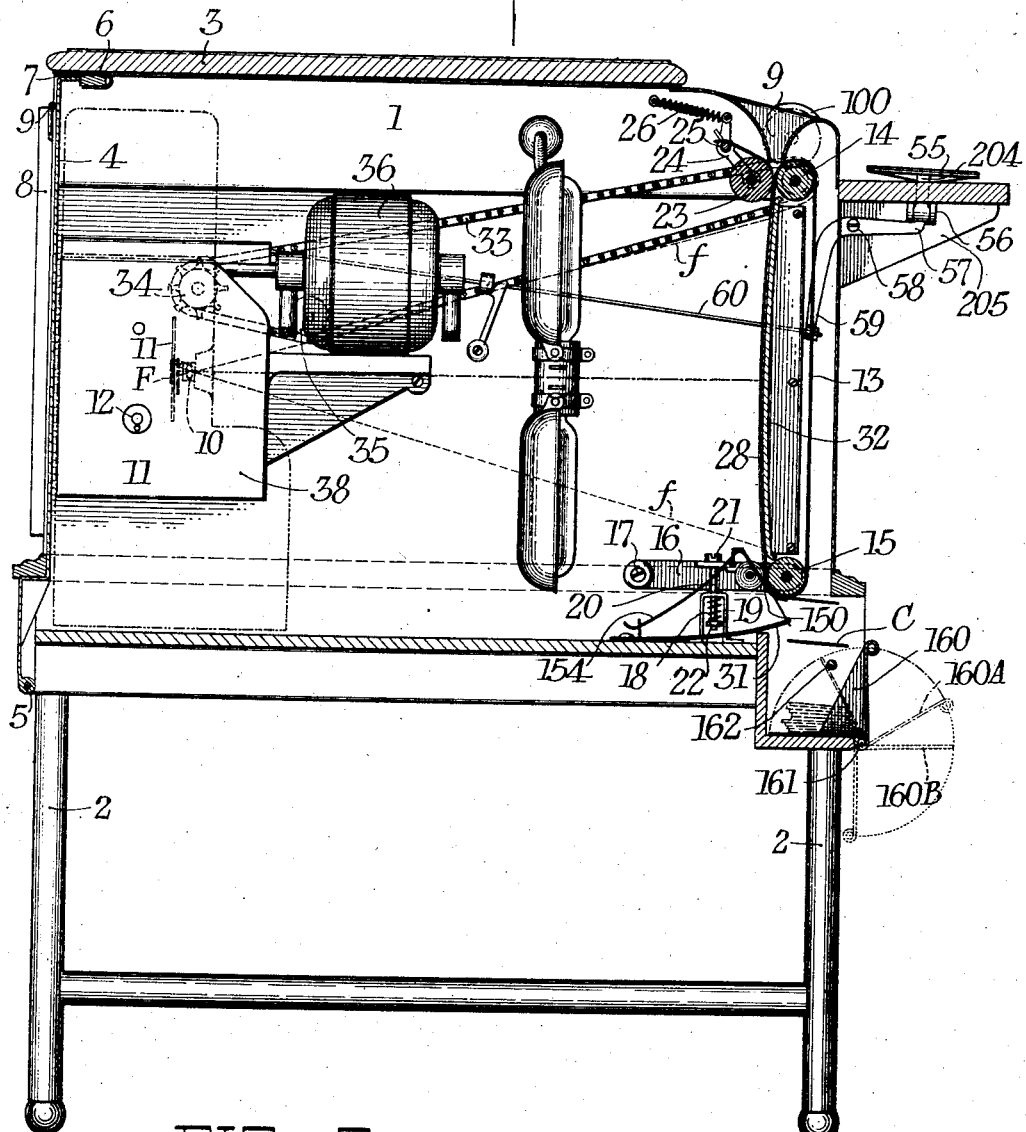
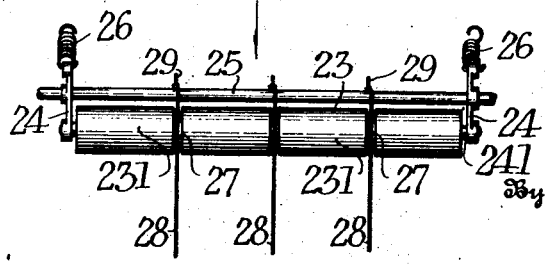
Inventor
Roy S. Hopkins,
Attorney

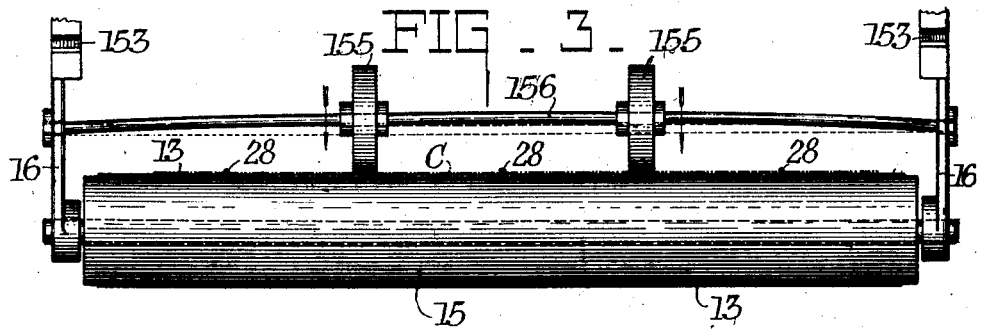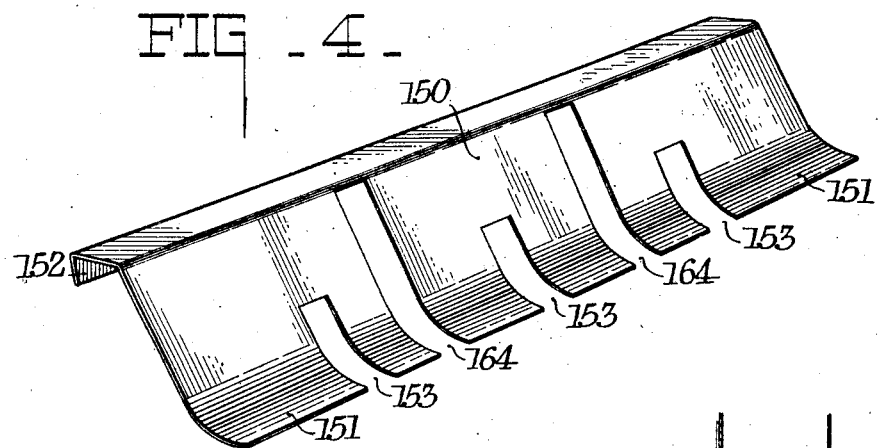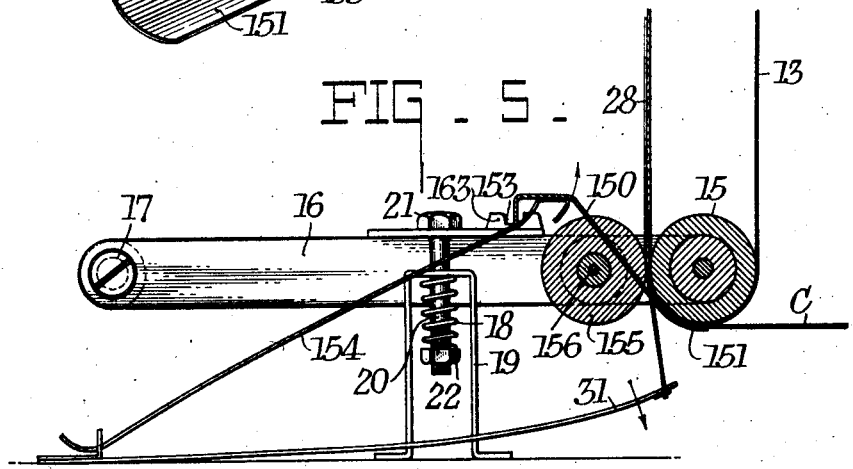

March 7, 1933.  R. S. HOPKINS  1,900,878
DOCUMENT PHOTOGRAPHING APPARATUS
Filed Dec. 3, 1927  4 Sheets-Sheet 3
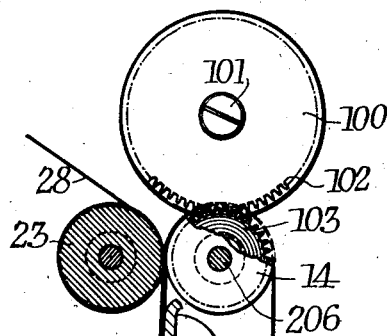
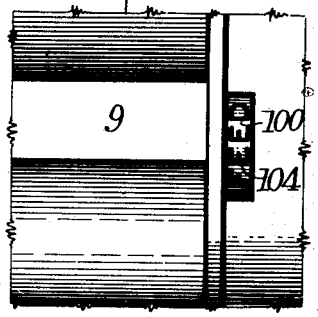
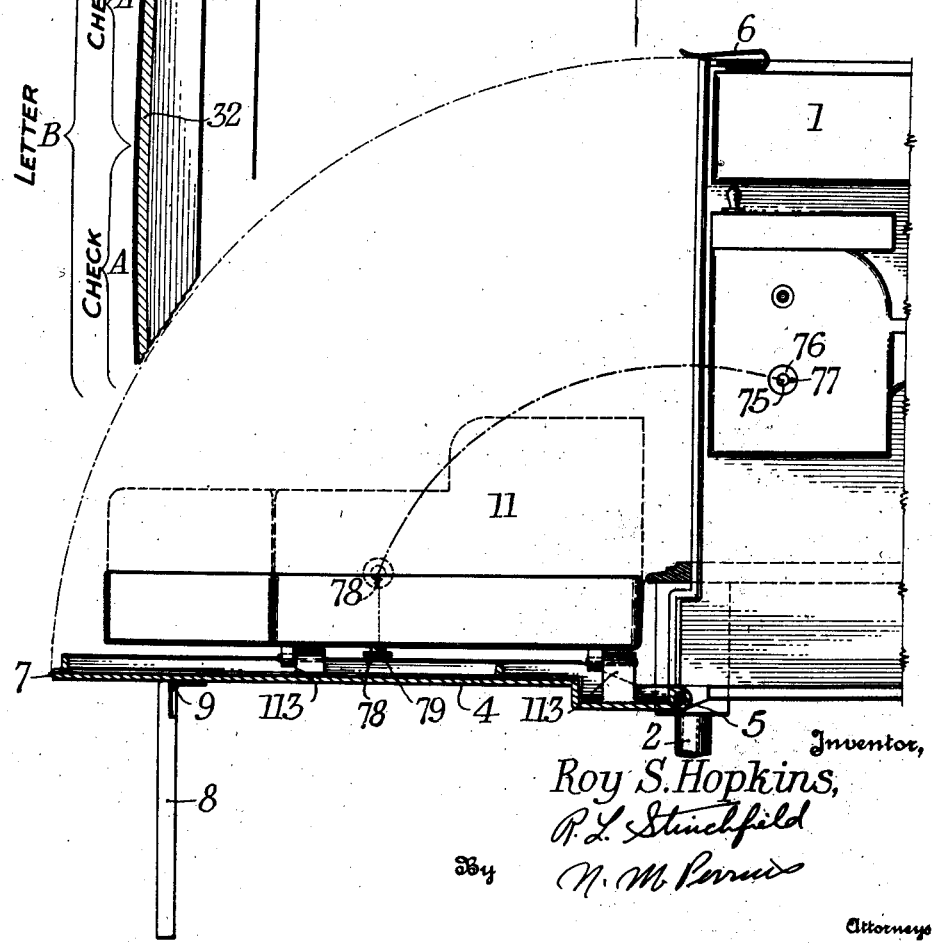

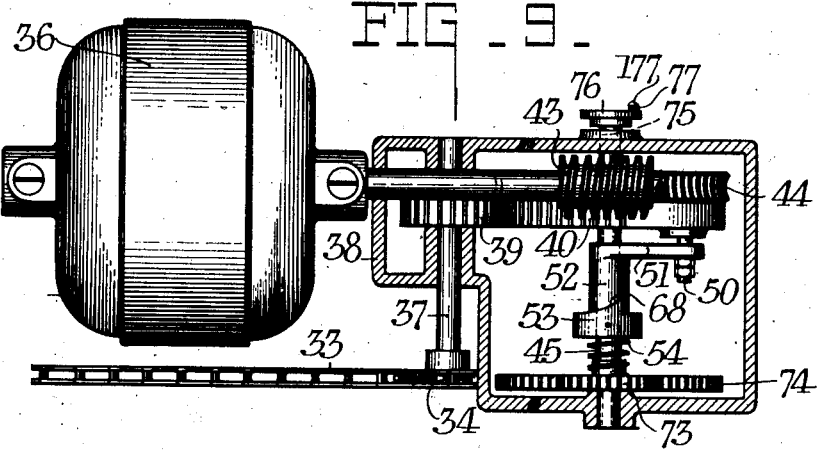
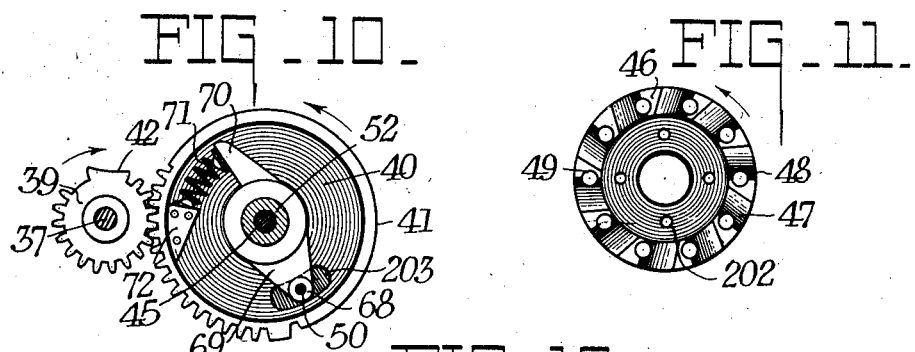
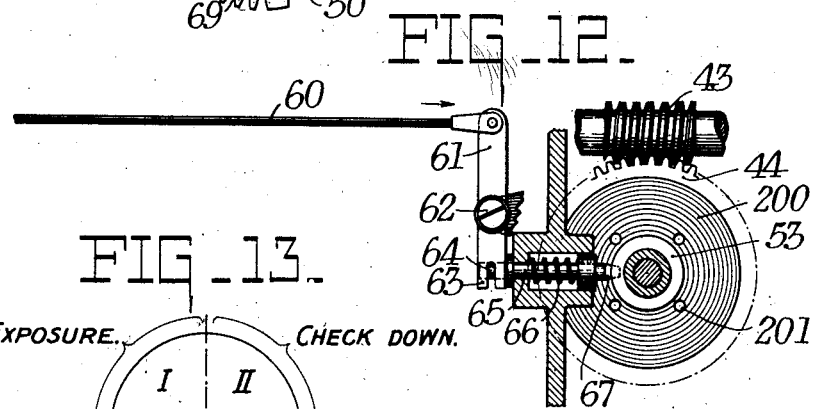
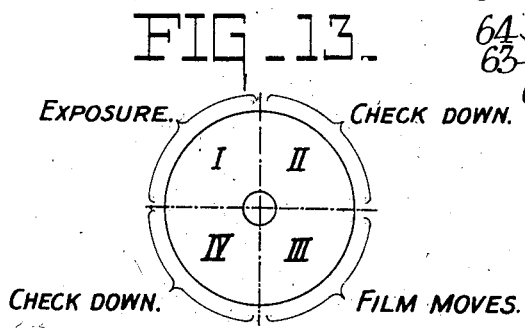

Patented Mar. 7, 1933

1,900,878

UNITED STATES PATENT OFFICE

ROY S. HOPKINS, OF ROCHESTER, NEW YORK, ASSIGNOR TO EASTMAN KODAK COMPANY, OF ROCHESTER, NEW YORK, A CORPORATION OF NEW YORK

DOCUMENT PHOTOGRAPHING APPARATUS

Application filed December 3, 1927. Serial No. 237,467.

This invention relates to improvements in an apparatus for making a photographic record of a series of individual sheets or documents such as bank checks.

An object of the invention is to provide an improved means for feeding documents intermittently past the exposure field of a camera; another object is to operate the camera continuously with each feeding operation, causing the film in the camera to be advanced upon one feeding operation, and to be exposed upon the next feeding operations, so that two checks may be simultaneously exposed; another object is to furnish an improved and automatic control for the connection and disconnection of these parts; another object is to mount the camera in a convenient and readily accessible manner; still another object is to provide for the use of the apparatus with documents of different size, special provision being made for the indication and delivery of documents of twice the single feeding capacity of the apparatus.

These and other objects will appear from the following description and the claims appended thereto wherein the specific advantages and details of improvement and invention are more specifically pointed out.

Coming now to the drawings wherein like reference characters denote like parts throughout:

Fig. 1 is a part side elevation, part section of a machine constructed in accordance with and embodying a preferred form of my invention;

Fig. 2 is a fragmentary elevation showing parts of the feeding mechanism;

Fig. 3 is a part plan view and part section of another portion of the feeding mechanism;

Fig. 4 is a perspective view of a plate which positions the material passed through the feeding mechanism so that it may be easily removed from the machine;

Fig. 5 is a part section, part side elevation of parts of the feeding mechanism exit;

Fig. 6 is a fragmentary section showing parts of the feeding mechanism, feeding dial, and showing diagrammatically the position of material fed through the machine;

Fig. 7 is a fragmentary view showing the feeding dial;

Fig. 8 is a fragmentary section showing the hinged rear wall upon which the camera is located;

Fig. 9 is a fragmentary section through the gear box of the driving mechanism;

Fig. 10 is a fragmentary section showing a portion of the driving mechanism;

Fig. 11 is a side elevation of one clutch member;

Fig. 12 is a fragmentary view of a clutch tripping device;

Fig. 13 is a diagrammatic view which illustrates the cycle of movement of my machine.

This machine is an improvement over the check photographing machines shown in U. S. application of George L. McCarthy, Serial No. 187,982, filed April 30, 1927, which has matured into Patent Number 1,806,763, patented May 26, 1931.

In the illustrated embodiment the machine comprises an upper casing or housing 1 supported by legs 2 and having a hinged cover 3 and a rear wall 4 hinged at 5 to swing downwardly from the housing 1 when a latch member 6, best shown in Fig. 8, is moved to release a latch pin 7. A leg 8 hinged at 9 to this wall forms a standard for supporting it in a substantially horizontal position.

Material to be photographed, such as letters or checks, may be fed to the machine through a chute 9 from which they are moved intermittently in the field of the objective 10 forming part of the camera 11 which is diagrammatically operated, as will be hereinafter described. The structure of the camera forms no part of the present invention, and is here shown diagrammatically as comprising an objective 10, the shutter 11, and a driving member 12. As will be seen from Fig. 1, the field of the objective is indicated by the lines f. The film F lies behind the shutter 11.

Checks or letters being fed into the chute 9 are intermittently moved in the following manner: The conveyor belt 13 passes around a driven roller 14 and a movable roller 15 which has bearings in arms 16 pivoted at 17 to the housing 1. Arms 16 are put under tension by the springs 18 held beneath the brackets 19 and surrounding bolts 20. By turning the bolt heads 21 relative to the nuts 22 the tension may be varied.

A roller designated broadly as 23 carried by bell crank levers 24 pivoted at 25 to the housing 1 and tensioned by the springs 26 presses against the belt 13 under the chute where the belt passes over roller 14. Roller 23, as shown in Fig. 2 is actually composed of a series of short rollers 231, these rollers being separated by wheels 27 having a slightly smaller diameter than the diameter of the rollers 231. Both the rollers and the wheels are supported upon the shaft 241. The wheels 27 are for supporting wires or cords 28 which are attached to pins 29 carried by the shaft 25. These wheels, therefore, do not turn with the rollers 231. Cords 28 at their other ends 30 are attached to spring fingers 31 as by knotting the end of the wire or string 28, as best shown in Fig. 5, these fingers serving to keep cord 28 under a light tension. I find ordinary violin strings to constitute an efficient and easily replaced cord, or metal wire may be used; and by the term "cord" I intend any suitable string, cord, wire, filament or the like.

In order to cause the cords to contact with the belt across the field of objective 10 there is a curved guideway 32 (Fig. 6) over which the belt 13 passes. The cords 28 also lying against the belt are likewise curved across the guideways 32. This curvature is preferably very slight say an 1/8 or a 1/4 of an inch to a foot. This curvature is not sufficiently great to move documents being photographed out of the focal plane of the objective 10.

Roller 14 is power-driven through a sprocket intermittently operated by the drive chain 33 which passes over a sprocket 34 and under an idler 35. The particular mechanism by which the sprocket 34 is driven can be varied widely, but I have shown rather fully preferred illustrative embodiments thereof. Sprocket 34 is driven from the motor 36 in the following manner: Referring to Fig. 9 sprocket 34 is carried by a shaft 37 having bearings in the gear box 38. Attached to shaft 37 is a multilated gear 39 having a concave surface 42. This gear meshes with a second multilated gear 40 loosely mounted on shaft 45 and the relation of the contacting teeth and surfaces of the gear is such that gear 40 may rotate continuously and intermittently drive gear 39. The smooth convex surface 41 of the gear 40 may turn and at the same time slide on the smooth fitting concave surface 42 of gear 39 during which movement gear 39 will remain stationary.

Gear 40 is carried and driven in the following manner: The motor 36 drives a worm 43 which meshes with a spiral gear 44 carried upon a shaft 45, this shaft and gear turning continuously with the motor. In gear 44 is an annular depression 200 indicated in shaded lines in Fig. 12. In this is bolted a clutch plate 46 shown in Fig. 10, the bolt holes being indicated at 201 and 202 in the two members respectively. Clutch plate 46 has on its outer surface a series of bevelled portions 47 terminating in shoulders 48 in which apertures 49 are provided. This clutch plate may be engaged by a pin 50 which is carried by an arm 51 on a sleeve 52 to which there is also attached a clutch actuating cam 53. Pin 50 has longitudinal movement, as hereinafter described, passing through slot 203 in gear 40 to which it has a resilient, shock absorbing driving connection as follows: Pin 50 is carried in a bearing 68 on an arm 69 on sleeve 52 which may rotate freely about shaft 45. An arm 70 integral with arm 69 carries one end of a spring 71, the other end of which is carried by a block 72 affixed to the gear 40. Thus when pin 50 is engaged with the clutch member 46, gear 40 is turned through the compression of spring 71 and the parts start smoothly without undue strain on the pin 50. A spring 54 normally thrusts the parts above described, that is, pin 50, arm 51, sleeve 52, and the cam 53, towards the clutch member 46. When the pin 50 engages in aperture 49, sleeve 52 and gear 40 will turn with gear 44. When the pin 50 is withdrawn from the clutch member 46 gear 40 will cease to rotate.

The following release is used to clutch and unclutch the parts: Referring to Fig. 1, an actuating bar 55 is provided, being mounted upon a bell crank lever 204 pivoted at 56 to a bracket 205. One end of lever 204 is adapted to contact and operate a second bell crank lever 57 pivoted at 58 to the housing and having an end 59 attached to a rod 60 which, as best shown in Fig. 12, is pivoted to a link 61 which may turn upon a pivot 62, and which has a slotted end 63 engaging a pin 64 on a plunger 65. Plunger 65 is spring pressed into the position shown in Fig. 12 wherein the end 67 engages cam 53 and holds it against the pressure of spring 45 of the pin 50 away from the clutch plate 46.

When member 55 is depressed rod 60 is moved in the direction shown by the arrow in Fig. 12. When this occurs pin 67 is withdrawn from the clutch face, permitting spring 45 to thrust pin 50 through slot 203 into an aperture 49 so that these parts will be continuously driven until the pin 67 again moves into the path of cam 53. When the high point on the cam 68 reaches the pin 67 the clutch will be thrown out. Thus gear 40 will be continuously rotated by holding down member 55 while the chain 33 will be intermittently rotated through the gearing described above, or, by releasing member 55, gear 40 may be driven one revolution at a time if desired.

On the shaft 45 there is a gear 73 which meshes with a gear 74 carried by a shaft 75 directly beneath shaft 45. On the other end of shaft 75 is a clutch member 12 comprising a disc 76 from which a pin 77 extends outwardly.

As best shown in Fig. 8 this clutch member lies in the path of a similar clutch member 78 carried by a drive shaft 79 through which the mechanism of camera 11 is operated. The camera is hinged at 113 to the door, which may be swung upon its pintle 5. For loading the camera the door 4 is open as in Fig. 8, and the camera is swung about the hinge 113, as shown.

It may then be opened for loading and unloading. The specific camera structure is no part of the invention herein claimed. That used is similar to a motion picture camera in which the film is pulled down alternately with the opening of the shutter. The gear ratio driving these parts is such that two turns of the driving clutch 78 are necessary for the complete cycle of operations. That is, during a part of one turn of clutch 78, the shutter 11 will be open and during a part of the next turn the film will be advanced by the beater type of pulldown indicated at 207. The rate of operation, even when running continuously, is notably slower than the normal speed of a motion picture machine, a complete cycle of camera operation occupying a time interval of the order of a second.

When the camera is swung into the position shown in dashed lines, Fig. 8, and the door is closed, clutch members 77 and 78 are moved into alignment and pin 77 will engage and drive the clutch member 78. Thus the camera is automatically clutched and unclutched with the drive mechanism by merely opening and closing door 4. It should be noted that pin 77 has a tapered point 177. This tends to thrust the pin on clutch 78 to one side if it lies in the path of clutch member 78 when the door is being opened or closed.

Each time gear 40 makes one revolution, gear 39 is driven for a portion of this revolution, and, as before described, shaft 37 transmits this intermittent movement to roller 14. At each actuation of roller 14, belt 13 of the conveyor moves a unit distance sufficient to move a check into the focal plane of objective 10. This movement may be indicated by the brackets A in Fig. 6. It is, of course, somewhat larger than the actual width of the large check, and when checks alone are being fed into the machine, it is not necessary to watch the feeding dial 100. This dial carried by a shaft 101 which is affixed to a gear 102 meshes with a gear 103 carried by the shaft 206 which supports roller 14. These gears have a two to one relationship and on one side of dial 100 the word Feed appears. At 180° from this word there is a dot or the dial may be left blank, the object of the word Feed, being that where a letter of the size indicated by the bracket B, Fig. 6. is to be photographed, it should be fed to the machine when the word Feed occurs, since two checks are simultaneously photographed by the camera, and if the latter were fed at the wrong time only one-half of it would be in position for exposure.

As indicated in Fig. 13 the cycle of operations of my machine may be diagrammatically illustrated as consisting of four parts, part I, the conveyor stands still and the camera makes an exposure, part II, the conveyor moves a check down, part III, the conveyor stands still and the camera film is moved, and part IV, the conveyor moves a second check down. This conveyor is twice intermittently moved between exposures where checks are being photographed, and twice moved for a single letter which moves, of course, as above explained, by feeding only when the dial so indicates.

It is important that the checks be retained in the position and order in which they are fed to the machine. To accomplish this the structure shown in Figs. 3, 4. and 5 is used. Roller 15 around which the conveyor plate 13 passes is provided with a check positioning exit plate 150, this plate having a curved bottom 151 and a back flange 152 adapted to engage a slot 163 in which it may turn as upon a pivot. A light spring 154 tends to thrust the plate 150 in the direction shown by the arrows, Fig. 5, this causing the curved foot 151 to snugly engage the periphery of that portion of the conveyor 13 that turns about roller 15. Three slots 153 are provided through which the wires 28 pass and two slots 164 are provided for the rollers 155 which frictionally engage either a check being fed through the mechanism of the belt 13. As shown in Fig. 3 rollers 155 are carried by the resilient shaft 156 which presses them in the direction shown by the arrows. As indicated in Fig. 5 when a check or other document is released from the conveyor, it is thrust upwardly in a substantially horizontal position so that when released it may drop down into the check receptacle. In this way the checks will always face downwardly.

To facilitate removing the checks, as best shown in Fig. 1, I provide a check receptacle including an L-shaped member 160 pivoted at 161 to the housing so that it may normally swing from the full line position to that shown in broken lines at 160A. In this position one edge may rest against pin 162. When thus turned the checks may be easily removed in a pile or stack.

When, however, the machine is used for photographing larger documents, such as checks, the receptacle is swung to the position in broken lines at 160B, in which position the letters may fall through upon the shelf which is thus provided.

It is to be understood that the disclosed embodiment is by way of example and that I consider as included within my invention all such modifications and equivalents as fall within the scope of the appended claims.

Having thus described my invention, what I claim as new and desire to secure by Letters Patent is:

1. In a document photographing apparatus in combination, a camera having mechanism including a film advancing means and a shutter, a document feeder, mechanism for intermittently operating the document feeder and adapted to move the feeder to advance documents intermittently across the field of the camera, a common operating means for the camera and mechanism for advancing the document feeder, said common operating means including parts cooperating to produce a cycle of operations to advance the film and operate the shutter upon alternate operations of the document feeder mechanism.

2. In a document photographing apparatus in combination, a camera having mechanism including a film advancing means and a shutter, a document feeder, mechanism for intermittently operating the document feeder and adapted to move the feeder to advance documents intermittently across the field of the camera, a common operating means for the camera and mechanism for advancing the document feeder, said common operating means including parts cooperating to produce a cycle of operations to advance the film and operate the shutter upon alternate operations of the document feeder mechanism, and also including an automatically operative mechanism for discontinuing the operation of both the camera and the feeder upon the completion of half of said cycle.

3. In a document photographing apparatus in combination, a camera having mechanism including a film advancing means and a shutter, a document feeder, mechanism for intermittently operating the document feeder and adapted to move the feeder to advance documents intermittently across the field of the camera, a common operating means for the camera and mechanism for advancing the document feeder, said common operating means including parts cooperating to produce a cycle of operations to advance the film and operate the shutter upon alternate operations of the document feeder mechanism, and an indicator connected to the operating means for indicating the status of the mechanism in the cycle.

4. In a document photographing apparatus, in combination, a camera having a mechanism including a film advancing means, a shutter and a rotary member connected to and adapted to operate said shutter and said advancing means upon alternate rotations thereof, a document feeding means for intermittently carrying documents individually across the field of the camera, a common drive mechanism for the camera and for the feeding means, a connection between the drive mechanism, the feeding mechanism, and the rotary member for actuating the feeding mechanism once during one rotation of the rotary member and an automatically operative mechanism for disconnecting said connection after the completion of a single rotation of the rotary member.

5. In a document photographing apparatus, in combination, a camera having a film advancing means, a shutter and a rotary member connected to and adapted to operate said advancing means and said shutter upon alternate rotations thereof, a document feeding means, a drive shaft, a mechanism drivingly connected to the rotary member and to the feeding means to operate them once in timed relation, a clutch between the drive shaft and the last named mechanism and a mechanism automatically operative to disconnect said clutch after a single operation of the rotary member and the feeding means.

6. In a document photographing apparatus, in combination, a camera having a film advancing mechanism, a shutter and a rotary member connected to and adapted to operate said film advancing mechanism and said shutter at alternate rotations, a document feeding means for carrying documents individually across the field of the camera, a common drive mechanism for the camera and for the feeding means, connections between the drive mechanism and the feeding means including an intermittent movement and connections between the drive mechanism and the rotary camera member, said connections having a timed relation such that the rotary camera member will be rotated once for each movement of the feeding means.

7. In a document feeding apparatus in combination, a camera having mechanism including a shutter for intermittently exposing a film and film advancing device, connections between the shutter and film advancing device to retain the latter in a fixed position during the intermittent exposures of a film through the shutter, a document feeder, mechanism for intermittently advancing the feed to move documents across the field of the camera, a drive mechanism connected to the camera and the document feeder mechanism to move these parts through a definite cycle of operations including advancing the film through the film advancing device and exposing the film through the shutter only after a definite number of operations of the feeder, and an indicator connected to and actuated by the drive mechanism to show at what point in the cycle of operations the mechanisms are.

8. In a document photographing apparatus, in combination, a camera including a shutter and film feeding device operably connected together, mechanism for actuating the connected parts said camera having a definite cycle of operations, a feeder for conveying individual documents across the photographic field of the camera, mechanism connected to and adapted to actuate said feeder and including an intermittent movement, a drive shaft and a common control for connecting the last named mechanism and said camera mechanism to said drive shaft, to operate them synchronously, and an indicator also actuated synchronously with said mechanism and having a cycle of indication corresponding to that of the camera.

9. In a document photographing apparatus, a cabinet, means for feeding documents in the front of the cabinet, a camera support on the rear wall of the cabinet, a driving mechanism in the cabinet connected to the feeding means and to the camera, the connection to the camera including readily separable clutch members, the rear wall being hinged and outwardly swinging whereby the camera is readily accessible for loading and the clutch members being automatically connected and disconnected upon the relative movements of the wall and camera.

10. In a document photographing apparatus, a camera including a film advancing device and a shutter connected to operate in synchronism and constituting camera mechanism, a conveyor for moving documents across the field of said camera, an intermittent mechanism connected to the camera mechanism and for moving said conveyor by definite amounts whereby documents may be intermittently fed thereby, a receptacle positioned to receive said documents from the conveyor and having a hinged wall, the receptacle being of a size to receive documents corresponding in size to the extent of movement of the conveyor and being capable by swinging the hinged wall to an open position for receiving larger documents.

11. In a document photographing device, a camera, a document support and conveyor in the field of the camera and comprising a backing plate bowed toward the camera, an endless belt surrounding said plate and contacting its bowed surface, a series of cords contacting said belt and secured at their ends, the securing means for at least one of the ends being resilient, and means for operating the camera and belt in timed relation.

12. In a document photographing device, a camera, a document support and conveyor in the field of the camera and comprising a backing plate bowed toward the camera, an endless belt surrounding said plate and contacting its bowed surface, a series of cords contacting said belt and extending longitudinally thereof, each of said cords being separately secured at its ends and the securing means for at least one end being resilient, and means for operating the camera and belt in timed relation.

13. In a document photographing device, a camera, a document support and conveyor in the field of the camera and comprising a backing plate bowed from top to bottom and convex to the camera, an endless belt surrounding said plate and contacting its convex surface, a series of cords contacting said belt and extending vertically thereof, the cords being rigidly secured at their upper ends and each cord being separately and resiliently secured at its lower end, and means for operating the camera and belt in timed relation.

14. In a document photographic apparatus, a cabinet, a document support in the front of the cabinet, a power drive carried by the cabinet, a clutch connected to the power drive, a camera including a clutch member supported on the rear wall of said cabinet, said wall being hinged at the bottom and adapted to swing between two positions to engage and disengage the two clutch members, whereby when swung to one position in which said clutch members are disengaged said camera is readily accessible for loading.

Signed at Rochester, New York this 28 day of November 1927.

ROY S. HOPKINS.